United States Patent
Tanimoto (10) Patent No.: US 6,256,579 B1
(45) Date of Patent: Jul. 3, 2001

(54) VEHICLE NAVIGATION SYSTEM WITH ROAD LINK RE-COSTING

(75) Inventor: Satoshi Tanimoto, Redondo Beach, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/352,444

(22) Filed: Jul. 13, 1999

(51) Int. Cl.$^7$ .................................. G01C 21/00
(52) U.S. Cl. .................. 701/201; 701/209; 701/210
(58) Field of Search ................................. 701/201, 209, 701/210, 202, 211

(56) References Cited

U.S. PATENT DOCUMENTS

| | | | |
|---|---|---|---|
| 4,926,336 | * 5/1990 | Yamada | 701/202 |
| 5,184,303 | * 2/1993 | Link | 701/210 |
| 5,291,413 | 3/1994 | Tamai et al. | |
| 5,291,414 | 3/1994 | Tamai et al. | |
| 5,303,159 | 4/1994 | Tamai et al. | |
| 5,311,434 | 5/1994 | Tamai | |
| 5,878,368 | * 3/1999 | DeGraaf | 701/209 |
| 6,047,235 | * 4/2000 | Hiyokawa et al. | 701/201 |
| 6,064,941 | * 5/2000 | Nimura et al. | 701/210 |
| 6,125,323 | * 9/2000 | Nimura et al. | 701/207 |

* cited by examiner

Primary Examiner—Michael J. Zanelli
(74) Attorney, Agent, or Firm—Brinks Hofer Gilson & Lione (57) ABSTRACT

The present invention provides a vehicle navigation system that can customize an optimum route to the driver's road preference. The vehicle navigation system includes at least one data table that contains a set of road data. Each set of road data represents characteristics of one road segment, such as a travel time, a length and a type of the road segment. The navigation system also includes at least one coefficient table that contains a number of coefficients. Each coefficient corresponds to one road segment. In a route search operation, an optimum route is calculated so as to optimize road data that have been modified by weighting the road data by the coefficients. The coefficients are changed based on the user's personal preference on the corresponding road segments. More specifically, a coefficient is penalized when the corresponding road segment that was part of the optimum route was not traveled. On the other hand, a coefficient is credited when the corresponding road segment that was not part of the optimum route was actually traveled.

27 Claims, 6 Drawing Sheets

| GEOGRAPHICAL POINTS | OCCURRENCES | LAST DATE |
|---|---|---|
| NODE | | |
| | ⋮ | |
| | | |

FIG.6

| LINK NO | COEFFICIENTS | OCCURRENCES | LAST DATE |
|---|---|---|---|
| 1 | 1 | | |
| 2 ⋮ | | ⋮ | |
| | 1 | | |

FUNCTIONS FOR PENALIZING LINKS

FIG.13

FUNCTIONS FOR CREDITING LINKS

VEHICLE NAVIGATION SYSTEM WITH ROAD LINK RE-COSTING

BACKGROUND OF THE INVENTION

This invention relates to a vehicle navigation system, and more particularly, to a vehicle navigation system that calculates an optimum route to a destination point.

Such a navigation system has two main and interrelated functions: the first function is to display to the user a map of the present vehicle location; and the second function is to provide guidance on a guided route from a starting point to a destination point. The second function is generally referred to as route guidance or selection. A route is typically optimized for one of various parameters, for instance, minimum travel time, minimum travel distance, maximum use of freeway, or other parameters pertaining to movement of a vehicle on a road network.

It is often the case, however, that an optimum route calculated by the system is not necessarily the most preferable route to the driver. We know that it will be most time-efficient to use highways when going from one point to another. Some drivers, nonetheless, prefer to detour at the expense of their time for purely personal reasons. For instance, some drivers prefer to drive narrow winding roads along seacoasts, rather than driving straight highways. Some drivers detour to visit an intermediate location, such as a store, or to enjoy watching scenery of their favorite spots. In calculating an optimum route, conventional navigation systems are ignorant about the driver's personal preference on roads. As a result, those conventional systems try to guide the driver repeatedly along the same calculated optimum route even in cases where the driver's driving history clearly shows that the driver has never followed the optimum route and takes the same detour every time the optimum route is presented.

BRIEF SUMMARY OF THE INVENTION

The purpose of the present invention is to provide a vehicle navigation system that can customize an optimum route to the driver's road preference. In accordance with the present invention, a vehicle navigation system includes at least one data table that contains sets of road data. Each set of road data represents characteristics of one road segment, such as a travel time, a length and a type of the road segment. The navigation system also includes at least one coefficient table that contains a number of coefficients. Each coefficient corresponds to one road segment and thus one set of road data. In a route search operation, an optimum route is calculated so as to optimize modified road data where the modified road data are the road data weighted by the coefficients. For instance, where a route is selected to minimize the travel time of the route, the navigation system selects a route along which a sum of the travel times weighted by the coefficients is the minimum.

The coefficients are changed, or updated, based on user's personal preference on the corresponding road segments. More specifically, a coefficient is penalized, or increased, when the corresponding road segment that was part of the optimum route was not traveled. On the other hand, a coefficient is credited, or decreased, when the corresponding road segment that was not part of the optimum route was actually traveled. Moreover, the coefficient is increased or decreased along a straight line or a curved line as the number of occurrences that the coefficient is changed increases.

The coefficient table may be renewed on a regular basis in such a way that coefficients are returned to an initial value if they have not been changed for a certain period of time. The coefficient table may be personalized to individual drivers so that the drivers can use a coefficient table personalized to them.

A vehicle navigation system according to the present invention may also include a history table that stores geographical points that have been designated as a starting point or a destination point. When two geographical points are designated, the navigation system first searches the history table. If either of the two designated geographical points is already stored in the table, an optimum route between them will be calculated, using the modified road data. However, if neither of the two geographical points is stored in the table, an optimum route is calculated, using the unmodified road data.

An optimum route may be searched for, using both the modified road data and the unmodified road data. For instance, the modified road data may be used to search for an optimum route in an area within a certain distance of either or each of the two geographical points, and the road data may be used to search areas other than the areas searched with the modified road data. The history table may be renewed on a regular basis in such a manner that geographical points stored therein are deleted from the table if they have not been designated for a certain period of time.

DETAILED DESCRIPTION OF THE INVENTION

Figure 1:
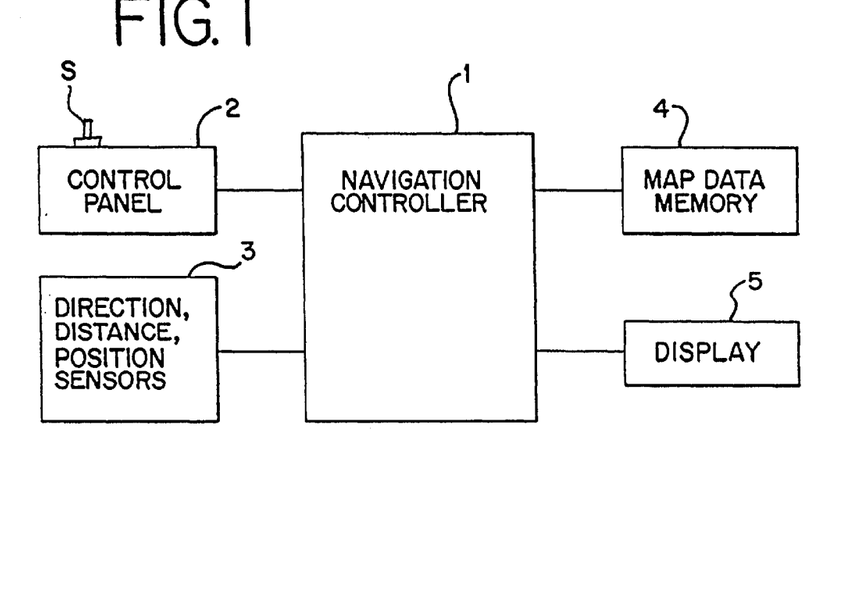
FIG. 1 shows a block diagram of a vehicle navigation system in accordance with this invention.

FIG. 1 illustrates a block diagram of a vehicle navigation system in accordance with this invention. The most important element of the navigation system is a navigation controller 1 that includes a microprocessor and associated circuitry. The navigation controller 1 receives instructions from a control panel 2. The control panel 2 includes a keyboard to be typed on by a user for various system control functions. The control panel 2 also includes a recosting switch S. The navigation controller 1 receives input signals from sensors 3 that include the vehicle speedometer and the odometer, a gyro, and a GPS (global positioning system) receiver for determining the vehicle travel direction, current position and a travel distance. A map data memory 4 is a hard disk, a CD-ROM or a DVD (digital video disk)-ROM that stores a set of map data for a particular area in which the vehicle is travelling. A display 5 is a small CRT or LCD that displays the present vehicle position and road guidance information. The display 5 may include an audible announcing capability.

Figure 2:
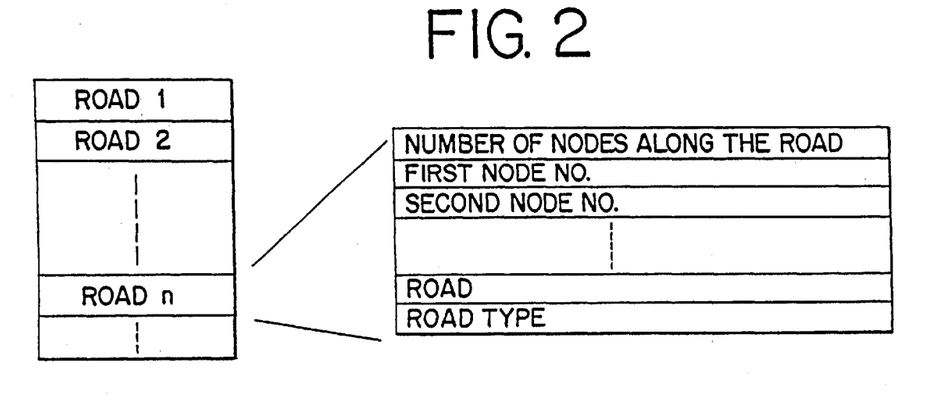
FIG. 2 shows a road data table.
Figure 3:
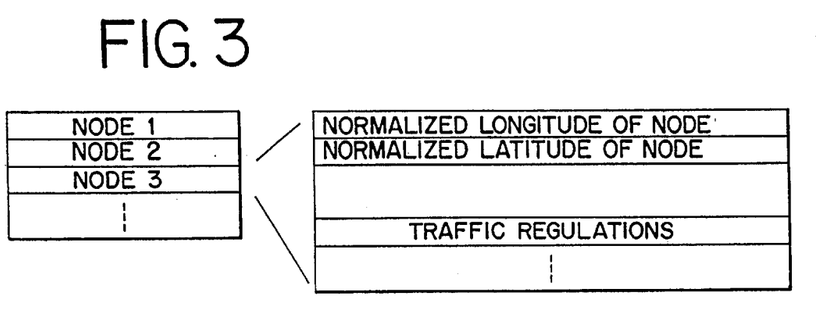
FIG. 3 shows a node data table.

In the map data, an intersection and a point where a road terminates are called a node, and a road segment connecting two adjacent nodes is called a link. Also, a time necessary to travel a certain distance is called a cost. Therefore, a cost of a link or a link cost means a time necessary to travel the link. Basically, the map data memory 4 maintains three map data tables for storing information on characteristics of roads: (1) a road data table; (2) a node data table; and (3) a link data table. As shown in FIG. 2, the road data table indicates a set of nodes located along each road. As shown in FIG. 3, the node data table includes information of each node, such as turn restrictions, toll booths, gates, etc.

Figure 4:
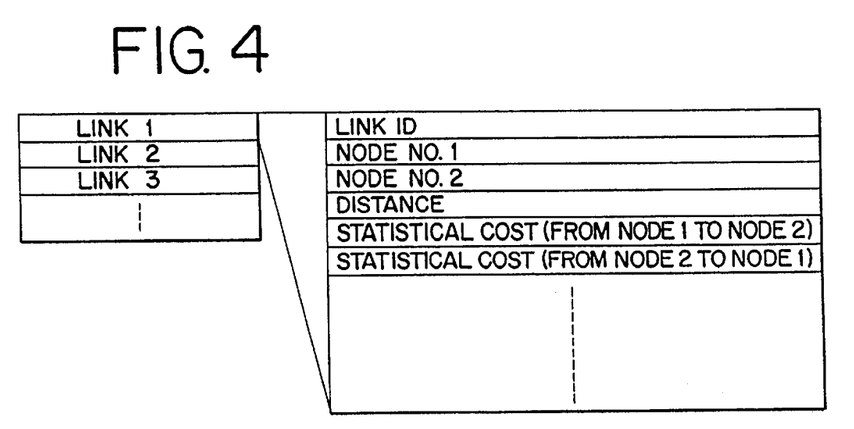
FIG. 4 shows a link data table.

FIG. 4 shows the link data table that includes information regarding a distance and a cost of each link. Each link cost can be obtained, for example, by actually driving the link under various road conditions and averaging the travel times. The link costs may also be obtained by predicting travel speeds based on the road characteristics of the links, such as the road width, road type, etc. The predicted link costs may be adjusted according to the local speed limits. In this embodiment, an optimum route is calculated so as to minimize a sum of the link costs along the route. Thus, when two geographical points are designated as a starting point and a destination point, the navigation controller 1 searches the link data table and chooses a route along which a sum of the link costs is the minimum. It should be appreciated that this route search operation is conventional and can be achieved by any conventional method, such as the Dijkstra method.

Figure 5:
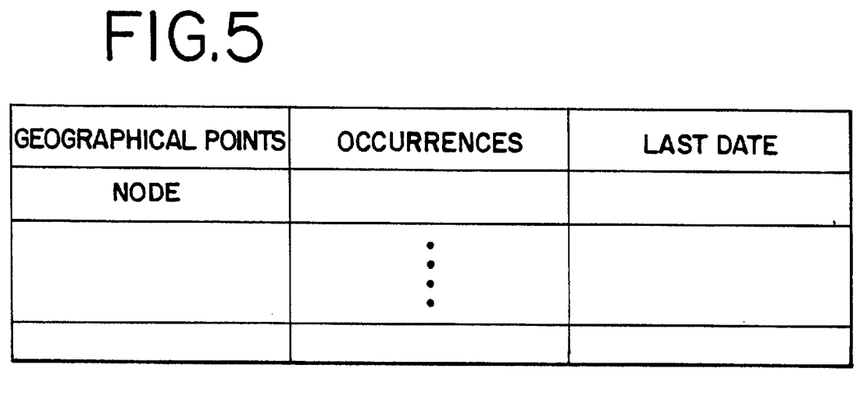
FIG. 5 shows a history table.
Figure 6:
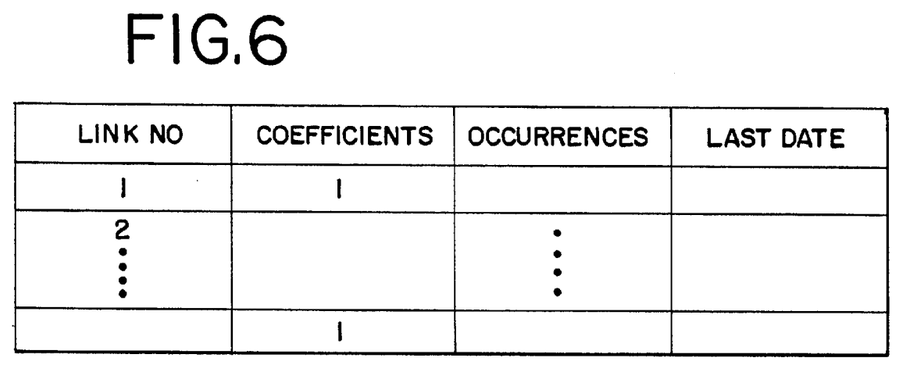
FIG. 6 shows a coefficient table.

The navigation controller 1 in this embodiment maintains various tables in its memory. One table is called a history table as shown in FIG. 5. The history table stores the geographical points or nodes that have been designated as a starting point or a destination point in the past. In the table, no distinction is made to the stored nodes as to whether they were designated as a starting point or a destination point. In connection with each of the stored nodes, the table also stores the number of occurrences that the node has been designated as a starting point or a destination point in the past and the last date on which it was designated. Another table is called a link recosting table as shown in FIG. 6. This table maintains recosting coefficients each corresponding to one link and thus one of the link costs stored in the link data table in FIG. 4. The initial value of each coefficient is 1 but is later changed so that it will reflect the driver's personal preference on roads. In connection with each of the recosting coefficients, the link recosting table also stores the number of occurrences that the coefficient has been changed in the past and the last date on which it was changed.

Figure 7:
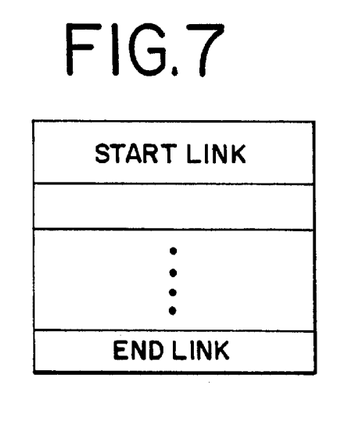
FIG. 7 shows an optimum route table.
Figure 8:
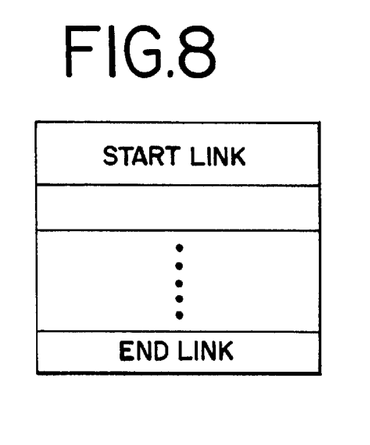
FIG. 8 shows an actual route table.

The navigation controller 1 maintains two more tables. One table is called an optimum route table which stores a series of links, together with the associated node information, along an optimum route, as shown in FIG. 7. Each time the navigation controller 1 calculates an optimum route, the links along the optimum route are stored in this table. The other table is called an actual route table that stores a series of links that the vehicle has actually traveled, as shown in FIG. 8. During travel a link is stored in this table each time the vehicle passes the link.

Figure 9:
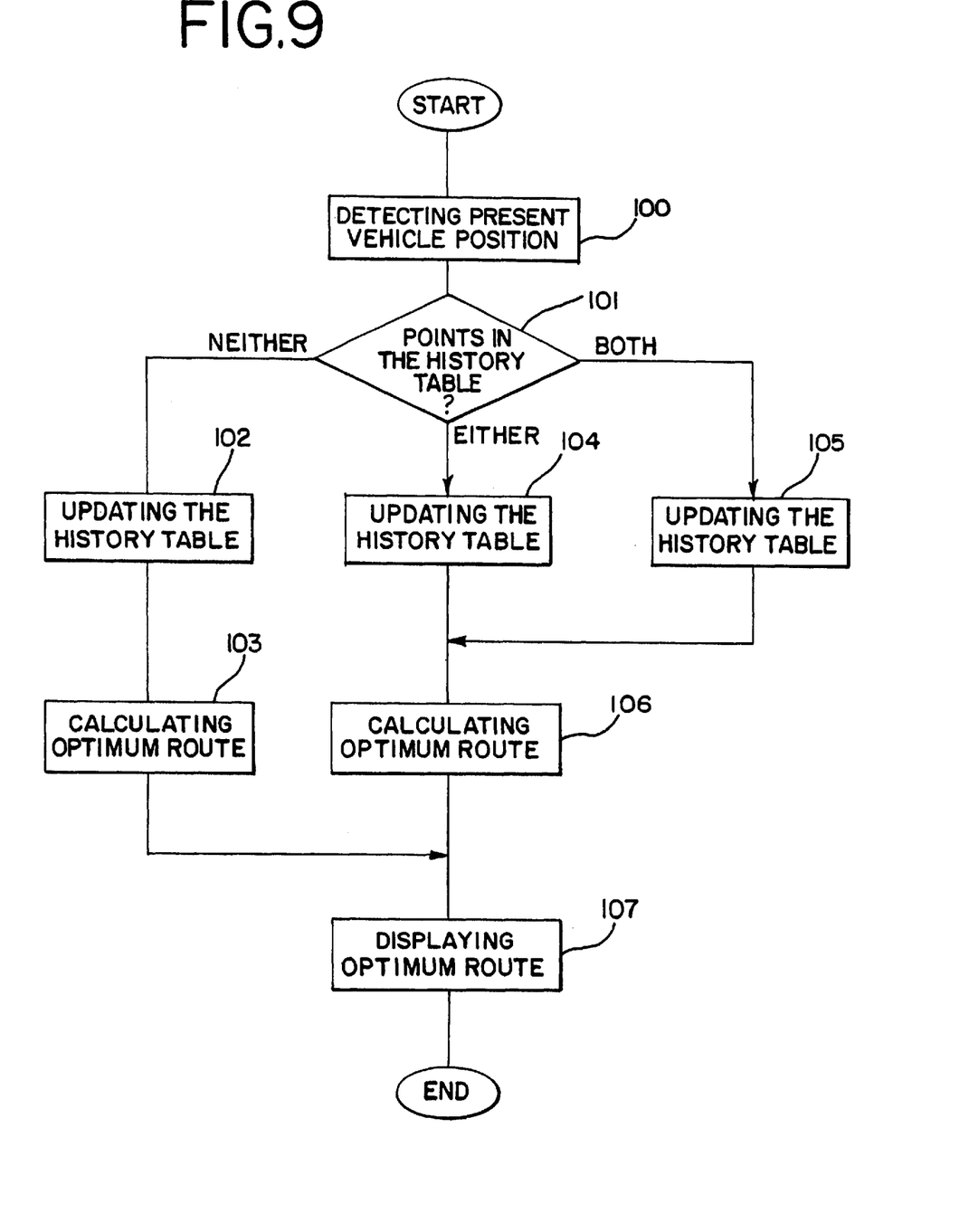
FIG. 9 is a flow chart showing an operation of calculating an optimum route in accordance with the present invention.

FIG. 9 is a flowchart showing how an optimum route is calculated by using the history table and the link recosting table. At the outset of travel, a driver inputs a destination point on the control panel 2. Initiated by the input of the destination point, the navigation controller 1 obtains information on the present vehicle location from the sensors 3 at Step 100. The present vehicle location becomes a starting point of the travel. The navigation controller 1 then searches the history table at Step 101 to find out whether or not the starting point and the destination point are stored in the table. If neither of the points is stored in the history table, the navigation controller 1 moves to Step 102 and updates the history table. More specifically, at Step 102, the navigation controller 1 stores in the history table: (1) both points; (2) a numeral 1 for each of the points to record that the points have been designated once as a starting point or a designation point; and (3) the current date for each of the points to record the date on which the points were designated. The navigation controller 1 then moves to Step 103, where it calculates an optimum route conventionally by reference to the link data table. Thus, in the route search operation at Step 103, neither the history table nor the link recosting table is referred to.

Returning to Step 101, if only one of the points is stored in the history table, the navigation controller 1 moves to Step 104 and updates the history table. At Step 104, the navigation controller 1 conducts the same operation as Step 102 for the point that was not previously stored. For the point that is already stored in the history table, the navigation controller 1: (1) increments the number of occurrences that the point has been designated as a starting point or the destination point; and (2) changes the already stored date to the current date to record the last date on which the point was designated. If, at Step 101, both points are already stored in the history table, the navigation controller 1 moves to Step 105 where it, for each of the points: (1) increments the number of occurrences that the point has been designated as a starting point or the destination point; and (2) changes the already stored date to the current date to record the last date on which the point was designated. Following either Step 104 or Step 105, the navigation controller 1 proceeds to Step 106 and calculates an optimum route between the starting point and the destination point.

The important difference in the route search calculation between Step 103 and Step 106 is that at Step 103, an optimum route is calculated conventionally, using only the link data table, whereas at Step 106, an optimum route is calculated using the link data table and the link recosting table. An optimum route found at Step 106 is a route along which a sum of the link costs weighted by the corresponding coefficients is the minimum. On the other hand, an optimum route found at Step 103 is a route along which a sum of the unweighted link costs is the minimum. Lastly, the navigation controller 1 displays at Step 107 the optimum route it just calculated. Note that in the route search operation at Step 103 or Step 106, the navigation controller 1 fills the optimum route table shown in FIG. 7 with a series of links located along the optimum route that was calculated.

Figure 10:
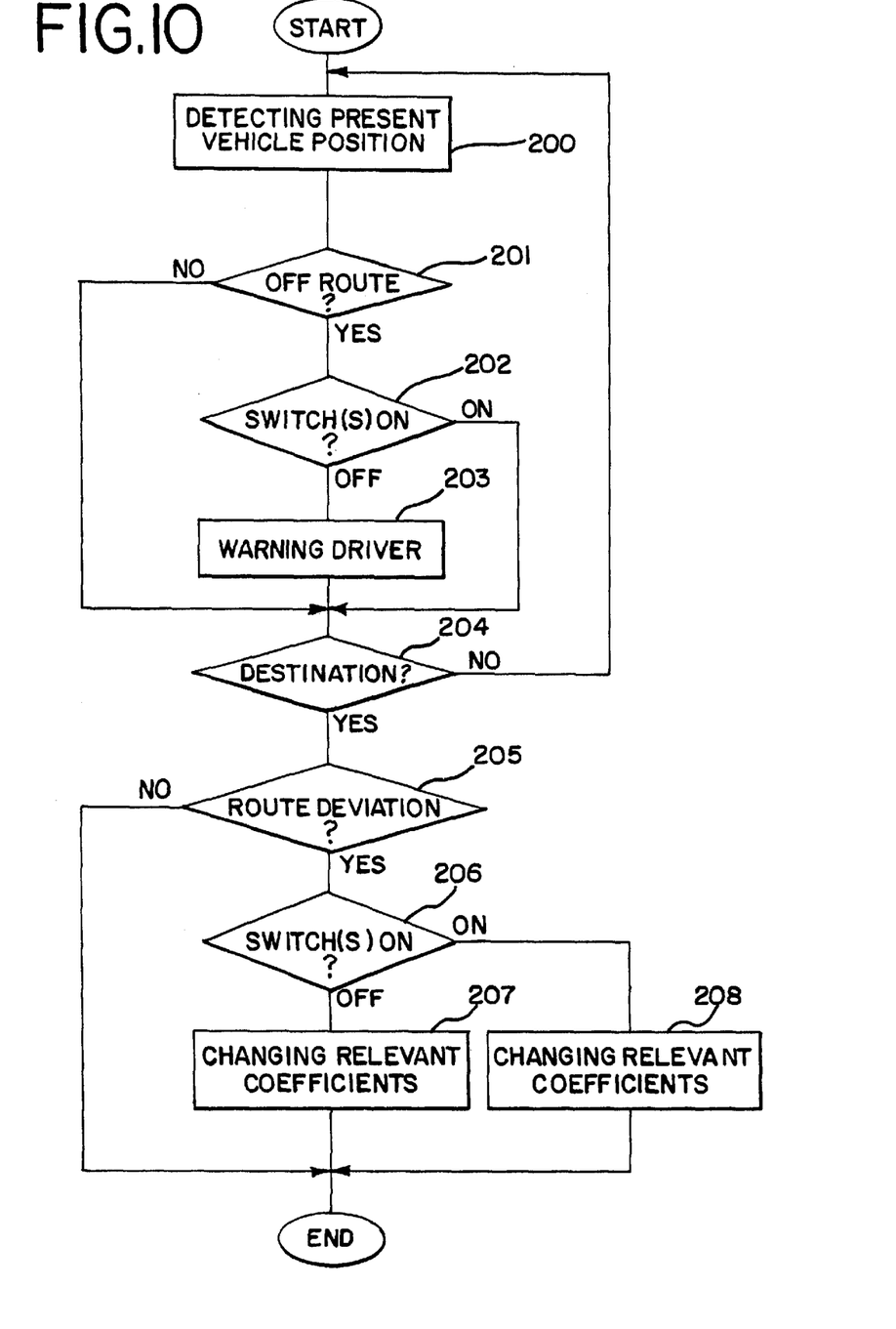
FIG. 10 is a flow chart showing an operation of responding to a off-route condition in accordance with the present invention.
Figure 11:
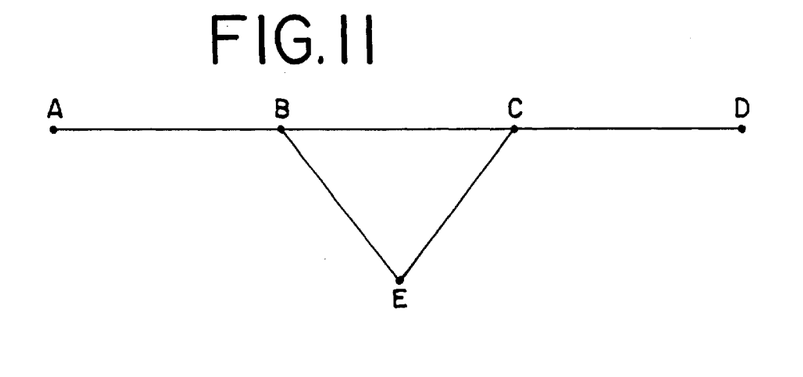
FIG. 11 shows a route for explaining an operation in accordance with the present invention.

FIG. 10 is a flowchart showing how the navigation controller 1 responds when the vehicle deviates from the optimum route. In order to facilitate understanding of the operation, assume that the driver wishes to travel to node D from node A as shown in FIG. 11. Further assume that the driver has never designated nodes A and D as either a starting point or a destination point and that the coefficients in the link recosting table are all the initial value, i.e., 1. Initiated by the input of destination point D, the navigation controller 1 performs the route search operation shown in FIG. 9. Suppose that the navigation controller 1 determines that an optimum route between points A and D is A→B→C→D. As a result of this route search operation, links A-B, B-C and C-D are stored in this order in the optimum route table in FIG. 7.

After the route search operation is completed, the optimum route is displayed on the display 5. At this point, the driver has two options. If the driver does not wish to follow the optimum route being displayed, the driver turns on the recosting switch S on the control panel 2. If the driver will follow the optimum route or is not sure whether to follow the optimum route, the recosting switch S will be kept off. That the switch S is turned on has two meanings to the navigation controller 1. First, it tells the navigation controller 1 that the driver is going to deviate from the optimum route intentionally. Second, the driver is going to teach the navigation controller 1 a route preferable to the driver over the optimum route the controller 1 calculated. In other words, when the switch S is turned on, the driver is expecting that the navigation controller 1 will memorize the driver's actual route and will present the route to the driver next time the driver designates the same points as a starting point and a destination point. Please note that the switch S may be a soft switch that is displayed on the display 5 for on/off selection.

The driver then begins to travel from point A towards point D. Referring to FIG. 10, based on the signals from the navigation sensors 3, the navigation controller 1 keeps track of the present location of the vehicle. Each time the vehicle passes a link, the navigation controller 1 stores the link at Step 200 (FIG. 10) in the actual route table shown in FIG. 8. The navigation controller 1 then determines at Step 201 whether the vehicle is on or off the calculated optimum route. The optimum route is continuously compared to the actual route being traveled by the vehicle. It is to be understood that the route guidance given by the navigation controller 1 only provides instructions to the driver. The driver is by no means constrained to drive only along the optimum route. For instance, the driver may be confused at a particular intersection, or forced to detour by road conditions, and hence deviate from the optimum route. Also, the driver may detour on purpose because of the driver's personal preference on roads.

If the navigation controller 1 determines at Step 201 that the vehicle is on the optimum route, it will proceed to Step 204. If it is detected that the vehicle is off the optimum route, the navigation controller 1 determines at Step 202 whether the recosting switch S is on or off. If the recosting switch S is off, the navigation controller 1 displays a warning on the display at Step 203 to advise the driver that the vehicle is off the optimum route. If the recosting switch S is on, the navigation controller 1 moves to Step 204 without warning the driver. When the switch S is on, the navigation controller 1 assumes that the driver intentionally deviated from the optimum route.

When warned of the deviation from the optimum route at Step 203, the driver has two options. If the driver detoured by mistake or was forced to detour, the driver will probably instruct the navigation controller 1 to recalculate an optimum route from the present vehicle position to the destination point. If the driver instructs the navigation controller 1 to recalculate an optimum route, the navigation controller 1 will again conduct the route search operation shown in FIG. 9 and begin the operation shown in FIG. 10 from the beginning. If the driver detoured intentionally, the driver may ignore the warning and continue driving. Now suppose that as shown in FIG. 11, the driver detours on purpose around link B-C and travels links B-E and E-C, rather than following the optimum route calculated by the navigation controller 1.

At Step 204 the navigation controller 1 determines whether the vehicle has reached the designation point D. If the vehicle has not yet reached point D, it returns to Step 200. If the vehicle has reached point D, the navigation controller 1 determines at Step 205 whether the driver followed the optimum route. This is determined by comparing the links stored in the optimum route table and the actual route table. By comparing the stored links in both tables, the navigation controller 1 learns which links of the optimum route have been traveled or have not been traveled and what links have been traveled although not on the optimum route. If it is found that the driver followed the optimum route, it will end the operation. If the driver did not follow the optimum route, it will move to Step 206. In the example shown in FIG. 11, links A-B and C-D are on the optimum route that have actually been traveled. Link B-C has not been traveled although it is on the optimum route. Instead, links B-E and E-C have been traveled although they are not on the optimum route.

At Step 206 the navigation controller 1 again determines whether the recosting switch S is on or off. If the switch S is off, the navigation controller 1 will perform an operation at Step 207. If the switch S is on, it will perform an operation at Step 208. Both Steps 207 and 208 are operations for modifying relevant coefficients in the link recosting table. There is a common scheme underlying both Steps 207 and 208. At both Steps, the links on the optimum route that were not traveled are penalized by increasing the corresponding coefficients in the link recosting table, and the links that were traveled although not on the optimum route are credited by decreasing the corresponding coefficients in the link recosting table. However, Steps 207 and 208 modify the relevant coefficients differently.

Figure 12:
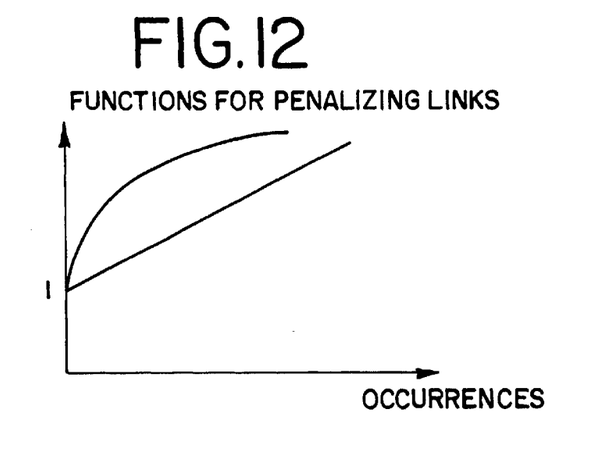
FIGS. 12 and 13 are graphs showing relationship between a change in a coefficient and the number of occurrences that the coefficient is changed.
Figure 13:
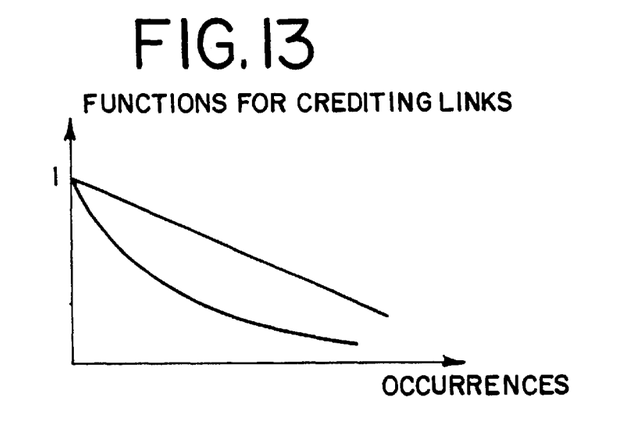

When the switch S is off, the navigation controller 1 changes the corresponding coefficients at Step 207 in accordance with the functions illustrated in FIGS. 12 and 13. FIG. 12 is for penalizing links. FIG. 13 is for crediting links. Two functions are illustrated in each figure. According to one function, a coefficient is increased or decreased along a straight line with an increase in the number of occurrences that the coefficient is changed. According to the other function, a coefficient is increased or decreased along a parabolic curve with an increase in the number of occurrences that the coefficient is changed. The functions are selected in advance at the factory. When changing a coefficient, the navigation controller 1 checks the link recosting table for the number of occurrences that it has been changed in the past. Based on this number, the navigation controller 1 increases or decreases the coefficient according to the function given in FIG. 12 or 13.

Turning back to the example shown in FIG. 11, link B-C is to be penalized because it was not traveled although it was on the optimum route. Links B-E and E-C are to be credited because they were traveled although not on the optimum route. When the switch S is turned off, the navigation controller 1, at Step 207, searches the link recosting table for the coefficient that corresponds to link B-C and increases it in accordance with the function given in FIG. 12. Likewise, the navigation controller 1 searches the link recosting table for the coefficients that correspond to links B-E and E-C. It then decreases them in accordance with the function given in FIG. 13. It should be noted that according to the functions shown in FIGS. 12 and 13, a decrease or an increase made at one time to the coefficients is small. Therefore, even after weighted by the changed coefficients, a sum of the weighted link costs of links B-E and E-C is still larger than the weighted link cost of link B-C. This means that when nodes A and D are designated again as a starting point and a destination point, the navigation controller 1 will again choose route A→B→C→D as an optimum route. However, if the driver persistently detours around link B-C and takes links B-E and E-C each time the optimum route A→B→C→D is presented, the operation at Step 207 will be repeated. Over time, the coefficient corresponding to link B-C becomes larger and the coefficients corresponding to links B-E and E-C become smaller. Eventually, the sum of the weighted link costs of links B-E and E-C will become smaller than the weighted link cost of link B-C. Once this happens, the navigation controller 1 will choose route A→B→E→C→D as an optimum route when points A and D are designated as a starting point and a destination point.

Returning to Step 206, if the recosting switch S is on, the navigation controller 1 will change the coefficients corresponding to links B-C, B-E and E-C at Step 208. Since the switch S is turned on, the driver expects the navigation controller 1 to memorize the driver's actual route and to present that route as an optimum route when the same points are designated. The navigation controller 1 decreases the coefficients corresponding to links B-E and E-C sufficiently and increases the coefficient corresponding to link B-C sufficiently so that a sum of the weighted link costs of links B-E and E-C will become smaller than the weighted link cost of link B-C. As a result, the navigation controller 1 will choose route A→B→E→C→D as an optimum route the next time nodes A and D are designated as a starting point and a destination point. After Step 207 or 208 is completed, the navigation controller 1 ends the operation shown in FIG. 10.

The history table and the link recosting table both may be renewed on a regular basis, for instance, every week. During the renewing operation, the navigation controller 1 deletes the points in the history table that have not been designated as either a starting point or a destination point for more than a month. Likewise, the navigation controller 1 returns to the initial value, i.e., 1, the coefficients in the link recosting table that have not been changed for more than a month. The drivers may sometimes detour out of pure caprice and will never take the same detour. The renewal operation erases traces of capricious or spontaneous detouring from the history table and the link recosting table.

It should be noted that some variations are possible in the above embodiment without departing from the gist of the present invention. One such variation is that in the route search operation in FIG. 9, weighting of link costs by the corresponding coefficients may be performed only on the links located within a few miles of either a starting point or a destination point, or both. The route search operation is complex and takes some time to complete the calculation. If the link costs were weighted by the corresponding coefficients all the way along the optimum route, the route search operation would take a significant amount of time to complete the calculation. Another variation is that drivers may have their own history table and link recosting table and set them in the navigation system before they begin to travel. Drivers have different road preferences. The route search operation can be personalized to individual drivers if the drivers have their own tables.

It should be appreciated that the present invention may be embodied in computer software operating on a general purpose processor. While the present disclosure does not include the actual computer software code, such code can be written in light of the disclosure of the present invention by those skilled in the art. Alternatively, the present invention may be embodied in a special purpose processor, an application specific integrated circuit (ASIC) or some other combination of computer hardware and software. Further, the present disclosure is illustrative and not limiting. Modifications will be apparent to those skilled in the art in light of the disclosure and are intended to fall within the scope of the appended claims.

What is claimed is:

1. A vehicle navigation system that calculates an optimum route between two geographical points designated as a starting point and a destination point, said navigation system comprising:

(a) at least one data table containing sets of road data each set representing characteristics of one road segment, (b) at least one coefficient table containing a set of coefficients each coefficient corresponding to one road segment, and (c) means for searching said optimum route between said two geographical points, using modified road data that are obtained by weighting said road data by said coefficients;

wherein said navigation system further comprises a history table storing geographical points designated in the past as a starting point or a destination point, and said optimum route is calculated, using both said modified road data and said road data, said modified road data being used to search an area within a certain distance of either or each of two newly designated geographical points when either of the points is already stored in said history table, and said road data being used to search areas other than the area searched with said modified road data.

2. A vehicle navigation system that calculates an optimum route between two geographical points designated as a starting point and a destination point, said navigation system comprising:

(a) at least one data table containing sets of road data each set representing characteristics of one road segment, (b) at least one coefficient table containing a set of coefficients each coefficient corresponding to one road segment, and (c) means for searching said optimum route between said two geographical points, using modified road data that are obtained by weighting said road data by said coefficients;

wherein said coefficient is changed based on user's personal preference regarding the corresponding road segment, said coefficient being penalized when the corresponding road segment that was part of said optimum route was not traveled, whereas said coefficient is credited when the corresponding road segment that was not part of said optimum route was actually traveled.

3. A vehicle navigation system according to claim 2, wherein said navigation system further comprises a history table storing geographical points designated in the past as a starting point or a destination point, and said optimum route is calculated, using said modified road data, when either of two newly designated geographical points is already stored in said history table.

4. A vehicle navigation system according to claim 3, wherein said optimum route is calculated, using said road data, if neither of the two geographical points newly designated is not stored in the history table.

5. A vehicle navigation system according to claim 3, wherein said history table is renewed on a regular basis so that geographical points are deleted from said history table if they have not been designated for a certain period of time.

6. A vehicle navigation system according to claim 2, wherein said road data include costs each representing a time to travel the corresponding road segment.

7. A vehicle navigation system according to claim 6, wherein said optimum route consists of road segments along which a sum of the corresponding costs weighted by the corresponding coefficient is the minimum.

8. A vehicle navigation system according to claim 2, wherein said coefficient is penalized or credited along a straight line with an increase in the number of occurrences that said coefficient is changed.

9. A vehicle navigation system according to claim 2, wherein said coefficient is penalized or credited along a curved line with an increase in the number of occurrences that said coefficient is changed.

10. A vehicle navigation system according to claim 2, wherein said coefficient table is personalized to individual drivers, and each driver uses the coefficient table personalized to the driver.

11. A vehicle navigation system that calculates an optimum route between two geographical points designated as a starting point and a destination point, said navigation system comprising:
    (a) at least one data table containing sets of road data each set representing characteristics of one road segment,
    (b) at least one coefficient table containing a set of coefficients each coefficient corresponding to one road segment, and
    (c) means for searching said optimum route between said two geographical points, using modified road data that are obtained by weighting said road data by said coefficients;
    wherein said coefficient table is renewed on a regular basis so that coefficients are changed to an initial value if they have not been changed for a certain period of time.

12. A vehicle navigation system that calculates an optimum route between two geographical points designated as a starting point and a destination point, said navigation system comprising:
    (a) at least one coefficient table containing a set of coefficients each coefficient corresponding to one road segment;
    (b) means for changing said coefficients based on user's personal preference regarding the corresponding road segments; and
    (c) means for searching said optimum route between said two geographical points, using modified road data that are obtained by weighting said road data by said coefficients;
    wherein said coefficient is penalized when the corresponding road segment that was part of said optimum route was not traveled, whereas said coefficient is credited when the corresponding road segment that was not part of said optimum route was actually traveled.

13. A vehicle navigation system according to claim 12, wherein said coefficient is penalized or credited along a straight line with an increase in the number of occurrences that said coefficient is changed.

14. A vehicle navigation system according to claim 12, wherein said coefficient is penalized or credited along a curved line with an increase in the number of occurrences that said coefficient is changed.

15. A vehicle navigation system according to claim 12, wherein said coefficient table is personalized to individual users, and each user uses the coefficient table personalized to the user.

16. A vehicle navigation system that calculates an optimum route between two geographical points designated as a starting point and a destination point, said navigation system comprising:
    (a) at least one coefficient table containing a set of coefficients each coefficient corresponding to one road segment;
    (b) means for changing said coefficients based on user's personal preference regarding the corresponding road segments; and
    (c) means for searching said optimum route between said two geographical points, using modified road data that are obtained by weighting said road data by said coefficients;
    wherein said coefficient table is renewed on a regular basis so that coefficients are changed to an initial value if they have not been changed for a certain period of time.

17. A method of calculating an optimum route between two geographical points designated as a starting point and a destination point, said method comprising the steps of:
    (a) defining at least one data table containing sets of road data each set representing characteristics of one road segment,
    (b) defining at least one coefficient table containing a set of coefficients each coefficient corresponding to one road segment,
    (c) defining a history table storing geographical points designated in the past as a starting point or a destination point, and
    (d) calculating said optimum route between said two geographical points, using modified road data that are obtained by weighting said road data by said coefficients when either of two newly designated geographical points is already stored in said history table;
    wherein said step (d) uses both said modified road data and said road data, said modified road data being used to search an area within a certain distance of either or each of said two newly designated geographical points when either of the points is already stored in said history table, and said road data being used to search areas other than the area searched with said modified road data.

18. A method of calculating an optimum route between two geographical points designated as a starting point and a destination point, said method comprising the steps of:
    (a) defining at least one data table containing sets of road data each set representing characteristics of one road segment,
    (b) defining at least one coefficient table containing a set of coefficients each coefficient corresponding to one road segment, and
    (c) calculating said optimum route between said two geographical points, using modified road data that are obtained by weighting said road data by said coefficients;
    wherein said coefficient is changed based on user's personal preference regarding the corresponding road segment, said coefficient being penalized when the corresponding road segment that was part of said optimum route was not traveled, whereas said coefficient is credited when the corresponding road segment that was not part of said optimum route was actually traveled.

19. A method according to claim 18, further comprising the step of defining a history table storing geographical points designated in the past as a starting point or a destination point, wherein said step (c) uses said modified road data when either of two newly designated geographical points is already stored in said history table.

20. A method according to claim 19, wherein said step (c) uses said road data when neither of the two newly designated geographical points is not stored in the history table.

21. A method according to claim 18, wherein said road data include costs each representing a time travel the corresponding road segment.

22. A method according to claim 21, wherein said optimum route consists of road segments along which a sum of the corresponding costs weighted by the corresponding coefficient is the minimum.

23. A method according to claim 18, wherein said coefficient is penalized or credited along a straight line with an increase in the number of occurrences that said coefficient is changed.

24. A method according to claim 18, wherein said coefficient is penalized or credited along a curved line with an increase in the number of occurrences that said coefficient is changed.

25. A method according to claim 18, wherein said coefficient table is personalized to individual drivers, and each driver uses the coefficient table personalized to the driver.

26. A method of calculating an optimum route between two geographical points designated as a starting point and a destination point, said method comprising the steps of:

(a) defining at least one data table containing sets of road data each set representing characteristics of one road segment, (b) defining at least one coefficient table containing a set of coefficients each coefficient corresponding to one road segment, and (c) calculating said optimum route between said two geographical points, using modified road data that are obtained by weighting said road data by said coefficients;

wherein said coefficient table is renewed on a regular basis so that coefficients are changed to an initial value if they have not been changed for a certain period of time.

27. A method of calculating an optimum route between two geographical points designated as a starting point and a destination point, said method comprising the steps of:

(a) defining at least one data table containing sets of road data each set representing characteristics of one road segment, (b) defining at least one coefficient table containing a set of coefficients each coefficient corresponding to one road segment, (c) defining a history table storing geographical points designated in the past as a starting point or a destination point, and (d) calculating said optimum route between said two geographical points, using modified road data that are obtained by weighting said road data by said coefficients when either of two newly designated geographical points is already stored in said history table;

wherein said history table is renewed on a regular basis so that geographical points are deleted from said history table if they have not been designated for a certain period of time.

* * * * *